United States Patent Office 2,874,752
Patented Feb. 24, 1959

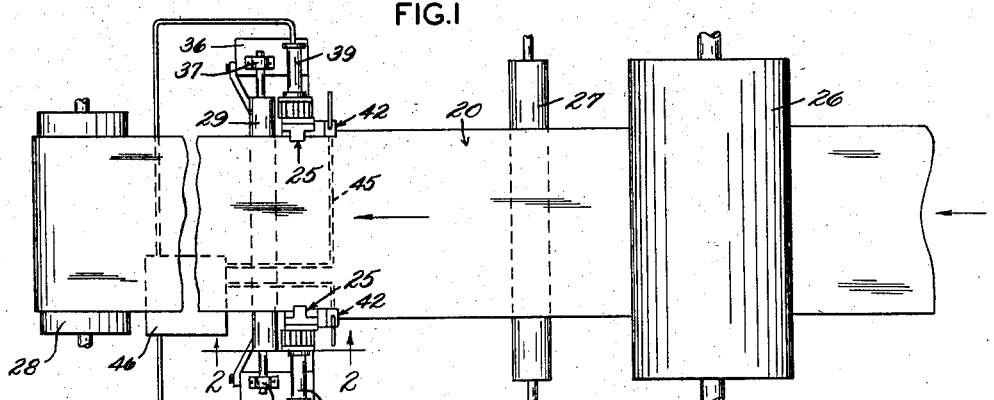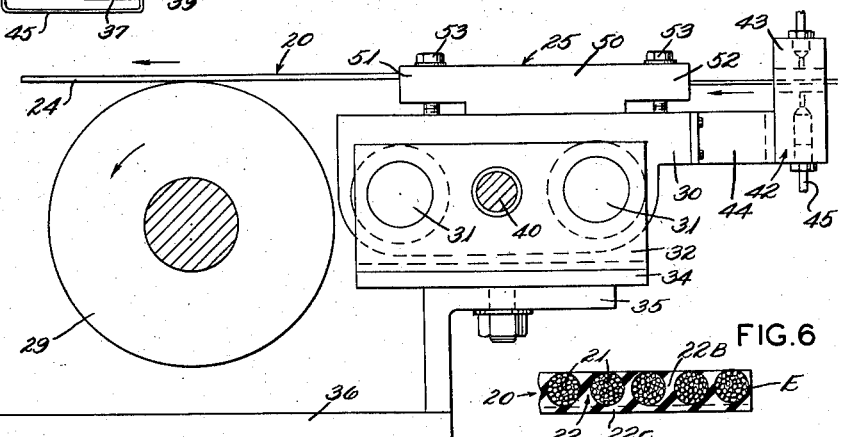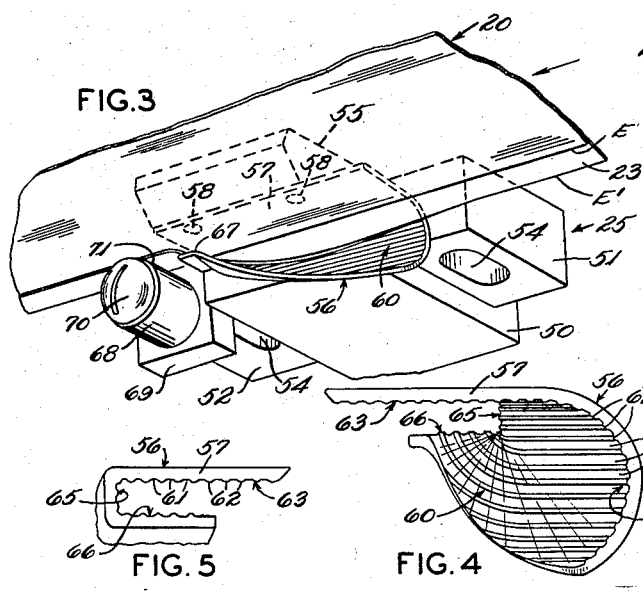

2,874,752

PREPARATION OF COATED FABRIC MATERIAL

Wilhelm Brey, Cuyahoga Falls, Ohio, assignor to The Firestone Tire & Rubber Company, Akron, Ohio, a corporation of Ohio Application February 17, 1958, Serial No. 715,605

13 Claims. (Cl. 154—1.8)

The present invention relates to the preparation of fabric material having a self-adhesive insulating coating and used in the manufacture of articles such as automotive tires. More particularly, the invention relates to apparatus for the preparation and treatment of the edges of rubberized fabric material, so as to provide an improved splice when short strips of fabric material which have been cut on a predetermined bias angle are joined to form a continuous web.

Until recently in this art, continuous webs of bias-cut fabic material were formed by manually overlapping the ends of successive short strips and pressing the ends together. Such overlap splicing was costly and, unless performed very accurately, would also possibly contribute to irregularity and imbalance of the finished tire. However, there has recently been developed apparatus which automatically performs all functions necessary to butt join or splice the trailing end of one web of bias-cut material to the leading end of a following web of material, without building up the bulk of the fabric in the area of the splice. Such apparatus requires that the end or outside cords of each fabric web be covered with a sufficient amount of rubber or other coating in a self-adhesive condition.

Therefore, it is an object of the present invention to provide improvements in apparatus for the preparation and treatment of the edges of fabric material having a self-adhesive insulating coating for use in the construction of automotive tires and the like.

It is a further object to provide improvements in apparatus for producing, as an article of manufacture, a web of fabric material having a self-adhesive insulating coating and specially prepared and shaped edges which readily permit short strips of the fabric material when bias-cut to be butt joined or spliced to form continuous webs for use in the construction of automotive tires and the like.

These and other objects of the invention, as well as the advantages thereof, will be apparent in view of the following detailed description considered with the attached drawings.

In the drawings:

Fig. 1 is a schematic plan view of an installation of apparatus according to the invention between the last roll of a calendering machine and the fabric wind-up reel;

Fig. 2 is an enlarged "left hand" view taken substantially on line 2—2 of Fig. 1;

Fig. 3 is a perspective view of a "right hand" forming die for contacting and shaping the specially prepared edges of the fabric;

Fig. 4 is an end view of the die member of Fig. 3, looking in the direction of fabric travel;

Fig. 5 is an end view of the die member opposite to the view of Fig. 4;

Fig. 6 is a sectional view of the fabric edge while on a calendering unit and prior to the application of an upper insulating skim coat or layer of rubber;

Fig. 7 is a sectional view of the fabric edge after application and preparation of the upper insulating layer of coating;

Fig. 8 is a sectional view of the fabric edge after contact and shaping by the die element shown in Fig. 3; and Fig. 9 is a sectional view of an improved butt joint or splice made possible by the present invention.

In the preparation of fabric material for use as tire plies, the cords of rayon, nylon, cotton or similar materials are dipped in specially formulated liquid rubber compounds and tension dried. Rubberizing of the fabric then follows and is done on a rubber calender or calenders by applying individual strips (or skim coats) of rubber on each side of the fabric and squeezing the rubber and fabric between the calender rolls sufficiently to cause the rubber to flow between and about each cord, thereby affording uninterrupted rubber insulation of the cords, as will be understood by those familiar with rubberizing by calendering cord tire fabric.

Referring to Figs. 6 and 7, the rubberized fabric material is indicated generally by the numeral 20 and includes the individual cords 21 and the insulating coating 22. In the finished form of the material 20, the separately applied layers of the coating 22 become bonded homogeneously around and between the cords due to the pressure of the calender rolls. However, for purposes of understanding the present invention, the coating 22 is best described as having an upper layer 22A, a medial layer 22B and a lower layer 22C.

Referring specifically to Fig. 6, the medial layer 22B and the lower layer 22C are first applied. The outer edge E is then trued and squared by a suitable means such as a hot knife (not shown) on the calender unit so that the outer edges of layers 22B and 22C are coextensive and longitudinally aligned. Referring specifically to Fig. 7, the upper layer 22A is then applied. The outer edge E' of layer 22A, which is then preferably trued and squared, forms a fin 23. The fin 23 has a thickness which is preferably one-tenth to one-quarter the thickness of the composite material 20. The width of the fin, that is the distance between E and E', is preferably five to ten times the composite thickness of the material 20. In any event, the upper insulating layer 22A is applied so as to form a fin 23 of substantial width in relation to thickness.

After passage through the calender unit, the fin 23 is wrapped around or turned progressively under and bonded to the medial and lower layers 22B and 22C so that the outer edge 24 of the material 20 is shaped in the manner shown in Fig. 8.

Fig. 9 is intended to show a typical improved quality butt joint or splice made possible by the specially prepared edge 24 of the material 20. The substantial thickness of adhesive coating provided by bonding of the fin 23 to the medial and lower layers 22B and 22C ensures adhesion between the abutting edges of two strips of bias-cut material.

Referring to Fig. 1, it is preferred that both edges of a web of fabric material 20 be prepared simultaneously. Each fin 23 of the upper insulating layer is shaped and bonded to the medial and lower layers 22B and 22C, by an individual edge forming die, indicated generally by the numeral 25. The individual forming dies 25 for either side of the web 20 are identical except for being opposite hand.

After passage through the calender unit, the last roll of which is indicated at 26, the web 20 is drawn over a first idler support roll 27 by a wind-up reel 28. A second idler support roll 29 is located behind the first to provide a tensioned span of the fabric material to which the edging dies are applied.

Referring to Fig. 2, each forming die 25 is carried by a guide or mounting block 30. Each block 30 is movably mounted on and stabilized by a pair of parallel slide rods 31. Each pair of slide rods 31 are mounted between a pair of end plates 32, mounted one on either end of a transverse base plate 34 carried on a flange 35. The flange 35 extends upwardly from a support stand 36. The second idler support roll 29 may be journaled in bearing blocks 37 carried on the support stand 36.

Each forming die 25 is moved transversely or laterally of the web of fabric material 20 by a conventional fluid-actuated cylinder 39 mounted on an end plate 32 and having an extensible shaft 40 connected to a slidable block 30.

The lateral movement of each forming die 25, in response to extension or retraction of each cylinder shaft 40, may be controlled by any suitable web edge position detector means located adjacent and one on either side of the tensioned span of fabric between the rolls 27 and 29 and indicated generally by the numeral 42. In one form of installation in which the improved forming dies 25 may be employed, the edge detector means 42 is as shown in U. S. Patent No. 2,794,444, issued June 4, 1957, to Frank J. Markey and assigned to Askania Regulator Company, Chicago, Illinois. However, other suitable detecting means, including photo-electric cells and receivers, could also be used.

The purpose of each edge detector means 42 is to position the forming die 25 in relation to the fin 23 and the edge E' of the web 20, as described in detail below. The detector head 42 is mounted on a bracket 44 extending to one side of a slidable block 30. Suitable piping 45 connects each detector head 43 with a common power source 46 (see Fig. 1) to supply actuating fluid to the cylinders 39.

Each edge forming die 25 includes a body plate 50 having a forward flange 51 and a rearward flange 52. The body plate 50 is securely, yet adjustably, attached to the mounting block 30 as by bolts 53 extending through similar angular slots 54 in the flanges 51 and 52. Between the flanges 51 and 52, the body plate 50 has a preferably bevelled extension 55 extended to overhang and extend inwardly of the fabric web 20 above the fin 23.

The specially prepared edges of the fabric web 20 are contacted and shaped by a shaping or die member 56. The die member 56 has several specially contoured areas or surfaces so that the fin 23 is wrapped around edge E and progressively turned under, forming the edge 24 (Fig. 8). The member 56 has a flat upper portion 57 attached, as by flush head bolts 58, to the under side of the overhanging extension 55 of the body plate.

The die member 56 is preferably formed from a quadrilateral piece of sheet steel or other similar ductile material. The inner or "work surface," indicated generally at 60, is preferably hard-chrome plated and has alternate grooves 61 and ribs 62 extending generally longitudinally thereon parallel with the edge of the upper portion 57. The alternating grooves 61 and 62 provide a corrugated or irregular quality to the "work surface" 60 so as to frictionally engage and hold the fin 23 of the fabric web in a laterally extended condition as it is turned around and under the edge E throughout the shaping operation.

Referring to Fig. 4, at the entry or forward end of die member 56, the work surface 60 has a substantially horizontal upper face 63 in the area of the upper portion 57, which gradually merges into a curved face 64 downwardly concavely curved in relation to the fabric web 20.

Referring to Fig. 5, at the exit or rearward end of die member 56, the work surface has the upper face 63, a side face 65 at substantially right angles to the upper face, and a lower face 66 which is substantially parallel to the upper face. The side face 65 and lower face 66 are both derived from the curved face 64 and progress rearwardly in a gradual curve therefrom except for the provision of an abrupt or sharply angled hump or bend in the commencement of the lower face, as indicated at 67. The height of the side face 65 is preferably slightly less than twice the thickness of the fabric web 20 when the fin 23 has been wrapped around forming the edge 24. (Fig. 8)

The forming die 25 also includes a roller 68 extending horizontally from a plate 69 attached to the face of the rearward flange 52 to press the fin 23 into a condition of adherence with the web layers 22B and 22C. The roller 68 is rotatably mounted on a bolt 70 so that the highest point on the surface thereof, as indicated at 71, is slightly above the lower face 66 of the die member 56.

As indicated above, the intersecting upper face 63, side face 65 and lower face 66 define a narrow substantially rectangular throat or opening through which the folded fin 23 and the remainder of the fabric web must pass. It has been found that provision of the slightly elevated roller 68 will cause the fabric to stretch between the roller and the hump 67 preceding surface 66 so that the fin 23 will be subjected to additional tension before passage over the roller, so that the adhesive bond between the fin 23 and web layers 22B and 22C will be smooth and unwrinkled.

As has now been described, a forming die 25 having a die member 56 will efficiently and expeditiously prepare and shape a web of fabric material to form an edge of insulation in a self-adhesive condition. The forming die 25 shown in Fig. 3 is "right hand"; that is, it is used to prepare and shape the right side of a fabric web moving away from the observer. The left hand side of such fabric web would be prepared by an identical die of opposite or left hand construction.

What is claimed is:

1. Apparatus for shaping the edge area of a longitudinally moving web having a self-adhesive insulating coating, said coating having a longitudinally aligned lower edge and an overlying thin fin extending laterally of said edge, including, a support adjustable laterally of said web and a shaping member attached to said support for turning said fin around and under said lower edge, said shaping member having a corrugated work surface frictionally engaging and holding said fin in an extended condition during turning thereof.

2. Apparatus for shaping the edge area of a longitudinally moving web having a self-adhesive insulating coating, said coating having a longitudinally aligned lower edge and an overlying thin fin extending laterally of said edge, including, a support adjustable laterally of said web and a shaping member attached to said support for turning said fin around and under said lower edge, said shaping member having a corrugated work surface frictionally engaging and holding said fin in an extended condition during turning thereof, said corrugations extending generally longitudinally of said shaping member.

3. Apparatus for shaping the edge area of a longitudinally moving web having a self-adhesive insulating coating, said coating having a longitudinally aligned lower edge and an overlying thin fin extending laterally of said edge, including, a support positioned above and adjustable laterally of said web and a shaping member, depending from said support, having a work surface for turning said fin around and under said lower edge, said work surface being corrugated to frictionally engage and hold said fin during turning thereof.

4. Apparatus for shaping the edge area of a longitudinally moving web having a self-adhesive insulating coating, said coating having a longitudinally aligned lower edge and an overlying thin fin extending laterally of said edge, including, a support positioned above and adjustable laterally of said web and a shaping member, depending from said support, having a work surface for turning said fin around and under said lower edge, said work surface having corrugations extending generally longitudinally of said shaping member to frictionally engage and hold said fin during turning thereof.

5. Apparatus for shaping the edge area of a longitudinally moving web having a self-adhesive insulating coating, said coating having a longitudinally aligned lower edge and an overlying thin fin extending laterally of said edge, including, a movable support above said web, means to maintain said support in a predetermined position in relation to said edge, and a shaping member depending from said support for turning said fin around and under said lower edge, said shaping member having a corrugated work surface extending generally longitudinally thereof to frictionally engage and hold said fin in an extended condition during turning thereof.

6. Apparatus for shaping the edge area of a longitudinally moving web having a self-adhesive insulating coating, said coating having a longitudinally aligned lower edge and an overlying thin fin extending laterally of said edge, including, a movable support above said web, means to maintain said support in a predetermined position in relation to said edge, and a shaping member, depending from said support, having a work surface for turning said fin around and under said lower edge, said work surface having corrugations extending generally longitudinally of said shaping member to frictionally engage and hold said fin during turning thereof.

7. Apparatus for shaping the edge area of a longitudinally moving web having a self-adhesive insulating coating, said coating having a longitudinally aligned lower edge and an overlying thin fin extending laterally of said edge, including, a support adjustable laterally of said web and a shaping member attached to said support having a work surface for turning said fin around and under said lower edge, said work surface including generally longitudinally extending grooves and ribs for frictionally engaging and holding said fin in an extended condition during turning thereof.

8. Apparatus for shaping the edge area of a longitudinally moving web having a self-adhesive insulating coating, said coating having a longitudinally aligned lower edge and an overlying thin fin extending laterally of said edge, including, a support positioned above and adjustable laterally of said web and a shaping member, depending from said support, having a work surface for turning said fin around and under said lower edge, said work surface including generally longitudinally extending grooves and ribs for frictionally engaging and holding said fin in an extended condition during turning thereof.

9. Apparatus for shaping the edge area of a longitudinally moving web having a self-adhesive insulating coating, said coating having a longitudinally aligned lower edge and an overlying thin fin extending laterally of said edge, including, a movable support above said web, means to maintain said support in a predetermined position in relation to said edge, and a shaping member, depending from said support, having a work surface for turning said fin around and under said lower edge, said work surface including generally longitudinally extending grooves and ribs for frictionally engaging and holding said fin in an extended condition during turning thereof.

10. Apparatus for shaping the edge area of a longitudinally moving web having a self-adhesive insulating coating, said coating having a longitudinally aligned lower edge and an overlying thin fin extending laterally of said edge, including, a support positioned above and adjustable laterally of said web and a shaping member, depending from said support, having a corrugated work surface frictionally engaging and holding said fin, said work surface acting to gradually turn said fin while in engagement therewith down and around said lower edge, the forward end of said work surface having a substantially horizontal upper face gradually merging into a curved face downwardly concaved in relation to said web, the rearward end of said work surface having a narrow substantially rectangular throat defined by said upper face and a lower and side face both derived from said curved face and progressing rearwardly in a gradual curve therefrom.

11. Apparatus according to claim 10 in which a roller extends horizontally from said support rearwardly of said shaping member, the highest point of said roller being elevated slightly above the lower face of said throat.

12. Apparatus according to claim 10 in which the lower face of said throat is substantially parallel with said upper face and merges with said curved face at an abrupt downward angle.

13. Apparatus according to claim 10 in which the lower face of said throat is substantially parallel with said upper face and merges with said curved face at an abrupt downward angle, and a roller extends horizontally from said support rearwardly of said throat, the highest point of said roller being elevated slightly above said lower face.

References Cited in the file of this patent
UNITED STATES PATENTS

| | | |
|---|---|---|
| 1,466,697 | Brice et al. | Sept. 4, 1923 |
| 2,379,859 | Barnard | July 10, 1945 |
| 2,772,088 | Nelson | Nov. 27, 1956 |